US009407752B2

(12) United States Patent
Le et al.

(10) Patent No.: US 9,407,752 B2
(45) **Date of Patent: *Aug. 2, 2016**

(54) METHOD FOR TRANSMITTING A MESSAGE FROM A PORTABLE COMMUNICATION DEVICE TO A SEPARATE TERMINAL AND ASSOCIATED PORTABLE DEVICE AND TERMINAL

(71) Applicant: DRNC HOLDINGS, INC., Wilmington, DE (US)

(72) Inventors: Minh Le, Neuilly sur Seine (FR); Frederic Lejay, Paris (FR); Carole Fagnoni, Neuilly sur Seine (FR)

(73) Assignee: DRNC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/461,825

(22) Filed: Aug. 18, 2014

(65) Prior Publication Data

US 2014/0357236 A1 Dec. 4, 2014

Related U.S. Application Data

(63) Continuation of application No. 11/707,263, filed on Feb. 16, 2007, now Pat. No. 8,843,114.

(30) Foreign Application Priority Data

Feb. 16, 2006 (EP) .................................... 06110016

(51) Int. Cl.
*H04W 4/18* (2009.01)
*H04M 1/725* (2006.01)
(Continued)

(52) U.S. Cl.
CPC ............ *H04M 1/7255* (2013.01); *G10L 15/26* (2013.01); *H04M 3/02* (2013.01); *H04M 3/42042* (2013.01); *H04W 4/12* (2013.01); *H04W 4/18* (2013.01); *H04M 1/72552* (2013.01)

(58) Field of Classification Search
None
See application file for complete search history.

(56) References Cited

U.S. PATENT DOCUMENTS 5,724,410 A 3/1998 Parvulescu
5,956,681 A 9/1999 Yamakita
(Continued)

FOREIGN PATENT DOCUMENTS

CN 1255011 5/2000

OTHER PUBLICATIONS

"Chinese Office Action", Chinese Application No. 200710092369.X, Mar. 24, 2011, 7 pages.
(Continued)

*Primary Examiner* — Diane Mizrahi
(74) *Attorney, Agent, or Firm* — Theodore Naccarella

(57) ABSTRACT

The disclosure relates to a method for transmitting a message from a portable communication device to a separate terminal including a step of recording at the portable communication device a voice message, and a step of generating, at the portable communication device, a multimedia file including at least the voice message. According to the disclosure, the portable communication device transmits to the separate terminal a signal including the multimedia file and a specific flag for indicating that the voice message is to be displayed as a text message. Upon reception of the signal at the separate terminal, the voice message is extracted and specific flag is detected. Upon detection of the specific flag, speech-to-text conversion is performed at the separate terminal in order to transform the voice message into a text message to be displayed.

22 Claims, 2 Drawing Sheets

1
A4
A7
2
3

(51) Int. Cl.

| | |
|---|---|
| ***H04M 3/02*** | (2006.01) |
| ***H04M 3/42*** | (2006.01) |
| ***H04W 4/12*** | (2009.01) |
| ***G10L 15/26*** | (2006.01) |

(56) References Cited

U.S. PATENT DOCUMENTS

| | | | | |
|---|---|---|---|---|
| 6,151,572 | A | 11/2000 | Cheng | |
| 6,219,638 | B1 | 4/2001 | Padmanabhan | |
| 6,820,055 | B2 | 11/2004 | Saindon | |
| 7,171,246 | B2 | 1/2007 | Mattila | |
| 8,843,114 | B2 * | 9/2014 | Le et al. | 455/412.1 |
| 2002/0146097 | A1 | 10/2002 | Vuori | |
| 2003/0050776 | A1 | 3/2003 | Blair | |
| 2003/0157968 | A1 | 8/2003 | Boman | |
| 2003/0158722 | A1 | 8/2003 | Lord | |
| 2003/0187641 | A1 | 10/2003 | Moore | |
| 2004/0102201 | A1 | 5/2004 | Levin | |
| 2004/0255041 | A1 | 12/2004 | Wen | |
| 2005/0266863 | A1 | 12/2005 | Benco | |
| 2007/0155346 | A1 | 7/2007 | Mijatovic | |
| 2013/0080918 | A1 * | 3/2013 | Bouzid et al. | 715/753 |
| 2013/0191458 | A1 * | 7/2013 | Krishnan et al. | 709/204 |

OTHER PUBLICATIONS

"Chinese Office Action (English Translation)", Chinese Application No. 200710092369.X, Mar. 24, 2011, 10 pages.

"European Search Report", EP Application No. 06110016.0, Jun. 9, 2006, 8 pages.

"United States Office Action", U.S. Appl. No. 11/707,623, Jun. 24, 2009, 13 pages.

European Office Action, European Patent Application No. 06110016.0, Sep. 9, 2009, 4 pages.

* cited by examiner

METHOD FOR TRANSMITTING A MESSAGE FROM A PORTABLE COMMUNICATION DEVICE TO A SEPARATE TERMINAL AND ASSOCIATED PORTABLE DEVICE AND TERMINAL

CROSS-REFERENCE TO RELATED APPLICATIONS

The present application is a Continuation of U.S. application Ser. No. 11/707,263, filed on Feb. 16, 2007, now U.S. Pat. No. 8,843,114, granted Sep. 23, 2014, which claims the benefit of European Patent Application No. 06110016.0, filed in Europe on Feb. 16, 2006.

BACKGROUND OF THE INVENTION

1. Field of the Invention

The present invention relates to a method enabling the transmission of a message from a portable communication device, such as a mobile phone or a personal digital assistant, to a separate device, in order to generate a text message to be displayed either locally at said separate device, or at a distant end user terminal.

2. Discussion of the Related Art

Today, mobile applications aiming at sending text messages (for instance via Short Message Services, Multimedia Message services or E-mails) are limited due to the fact that text input is difficult to perform at the portable device. This limitation could dramatically restrict the use of some new applications such as mobile weblog or blog, in which a great quantity of text may have to be inputted by the user of the mobile phone.

A known solution to counter message input issue is to use voice messages instead of text messages. Some mobile phones already implement this solution consisting in recording at the mobile phone a text message which is sent to an end user terminal via MMS (Multimedia Message Service). However, this solution requires that end user terminal (for instance another mobile phone) also supports this service. In addition, the end user might prefer to receive a text message to be displayed instead of listening to an audio message.

For blog applications, it is known to call a defined number corresponding to a server, and to leave a voice message which can be listened by other users through this server. Here again, there is no possibility to display a text message.

SUMMARY OF THE INVENTION

The aim of the invention is to remedy the above drawbacks by proposing a solution enabling an easy input of message at the portable communication device's side, while offering the possibility to display a text message at the destination terminal's side. To this aim, an object of the present invention is to provide a method for transmitting a message from a portable communication device to a separate terminal, comprising a step of recording a voice message at the portable communication device, and a step of generating, at the portable communication device, a multimedia file comprising at least said voice message, characterized in that it further comprises the following steps: transmission from said portable communication device to said separate terminal of a signal including said multimedia file and a specific flag for indication that voice message is to be displayed as a text message; reception at said separate terminal of said signal, extraction of said voice message and detection of said specific flag; upon detection of said specific flag, speech-to-text conversion at said separate terminal in order to transform said voice message into a text message to be displayed.

In one aspect of the invention, the text message is for local use, i.e. to be displayed at the separate terminal. The method according to the invention may comprise a further step for transmitting said text message from said separate terminal to an end user terminal such as a mobile phone or a personal computer.

Transmission of signal from portable communication device to separate device can be made by any kind of transmission links, such as wired or wireless links. Similarly, transmission of text message from separate device to end user terminal can be made through wired and/or wireless communication links.

In another aspect of the invention, a specific flag indicating that voice message is to be displayed as text message is included within multimedia file comprising the recorded voice message. Alternatively, said specific flag is sent in the signal as an attachment to said multimedia file.

A second object of the invention is a portable communication device for implementing the method, characterized in that it comprises: means for recording a voice message, and for generating a multimedia file comprising at least said voice message; software means for generating a signal including said multimedia file and a specific flag for indication that voice message is to be displayed as a text message; transmission means for transmitting said signal to a separate terminal.

A third object of the invention is a terminal for use as separate terminal in the method, characterized in that it comprises: means for receiving signal transmitted by said portable communication device, for extracting said voice message from the received signal and detecting said specific flag; upon detection of said specific flag, software means for converting said voice message into a text message to be displayed. This terminal can be either a server, or a personal computer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
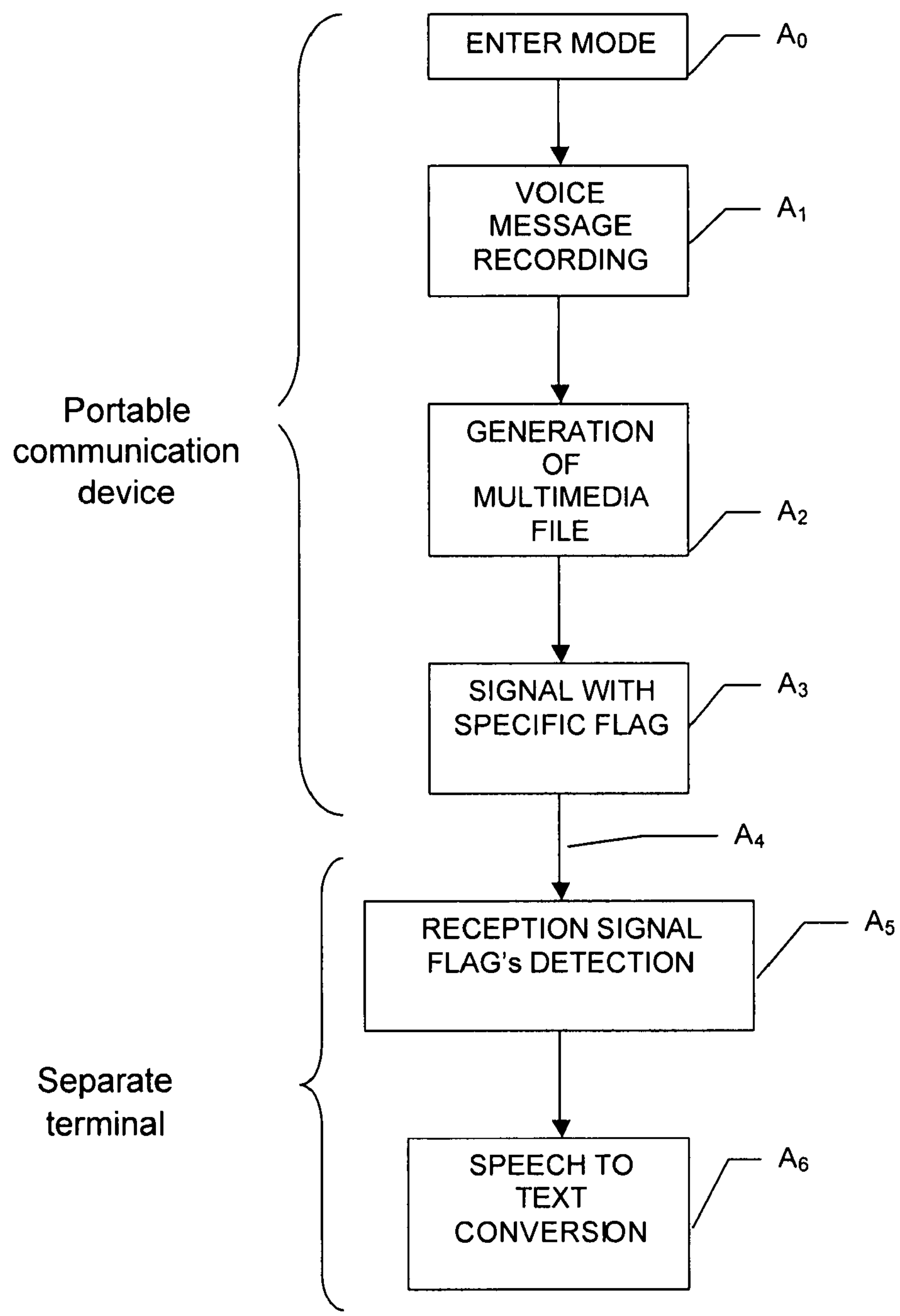
FIG. 1 shows succession of different steps involved in a preferred embodiment according to the present invention.

In relation with FIG. 1, a preferred embodiment of the method for transmitting a message from a portable communication device 1 (FIG. 2) to a separate terminal 2 (FIG. 2) is shown. Left part of FIG. 1 indicates the steps which are performed respectively at the portable device and at the separate terminal.

A first optional step A0 consists in entering into a specific mode dedicated to the transmission of the message according to the method of the invention, in order that said portable communication device 1 can identify that a recorded voice message is to be converted as text message. Said first step A0 can be initiated by a user of said portable communication device 1, for instance via a specific menu. Alternatively, said first step A0 is initiated automatically by said portable communication device according to the current use of said portable communication device 1. For instance, the portable device will automatically perform the method according to the invention when the device is in SMS/MMS or blog input mode.

Then, during a step A1, a voice message is recorded by the user at the portable communication device 1. A subsequent step A2 consists in generating, at the portable communication device, a multimedia file comprising at least said recorded voice message. According to the invention, portable communication device 1 generates then (step A3) a signal which includes not only said multimedia file but also a specific flag for indication that voice message is to be displayed as a text message. This signal is then transmitted (step A4) from said portable communication device 1 to said separate terminal 2, via any kind of existing transmitting links (wired or wireless links).

In the preferred embodiment, said first step A0 may also include a determination of the language which will be used for the voice message. Alternatively, determination of the language can be performed automatically during step A1 through analysis of recorded voice message. In case such determination of language is performed, the transmitted signal advantageously comprises information relating to determined language.

Specific flag can be directly included into said multimedia file. Alternatively, specific flag can also be sent as an attachment to said multimedia file.

Particular well-known processing can be performed at the time of generating multimedia file, such as noise reduction processing.

At the separate terminal's side, the transmitted signal is first received so that voice message can be extracted and specific flag can be detected (step A5). Upon detection of said specific flag, said terminal 2 will then perform a speech-to-text conversion (Step A6) in order to transform said voice message into a text message to be displayed. Mechanisms of such conversion are well-known and will not be further detailed.

If the text message is for local use, no further step is required. Alternatively, message text might be displayed on another end-user terminal (including originating portable communication device 1). In this case, the method further comprises a step A7 (see FIG. 2) for transmitting said text message from said separate terminal 2 to an end user terminal 3.

Figure 2:
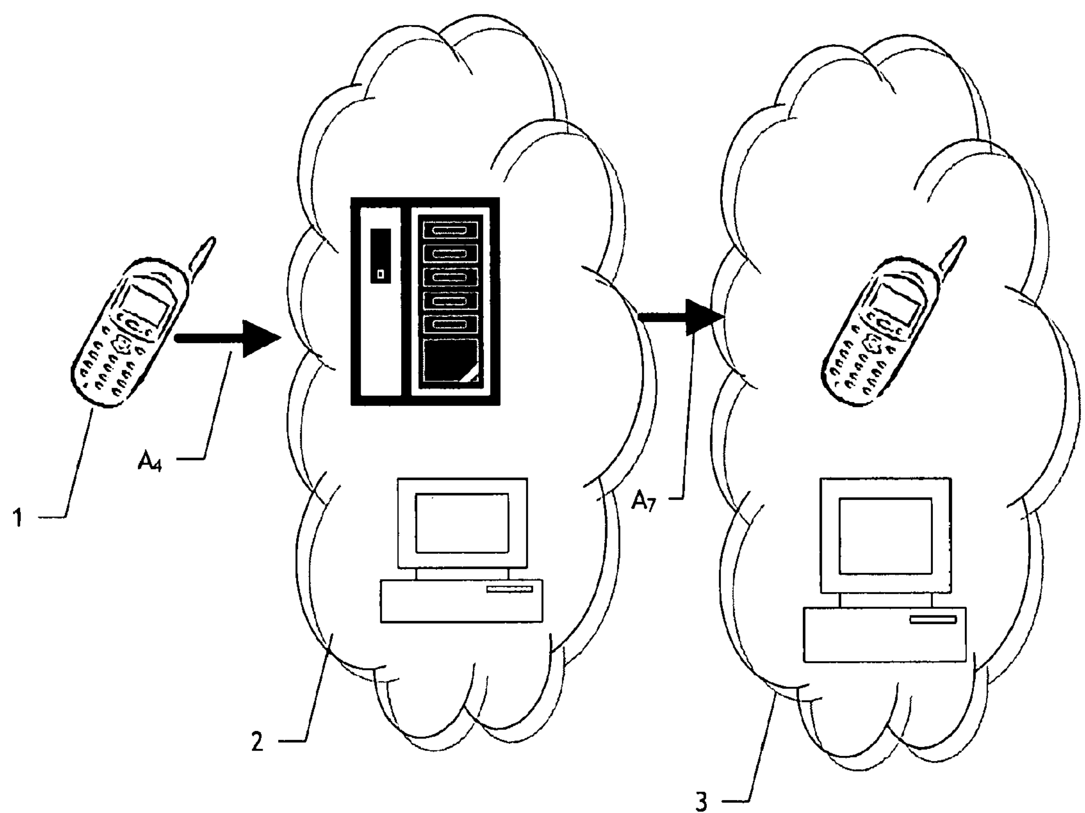
FIG. 2 shows schematically an overall system including a portable communication device, a separate terminal and a end user terminal for possible implementation of the method according to the invention.

FIG. 2 shows schematically an overall system including a portable communication device 1, a separate terminal 2 and an end user terminal 3 for possible implementation of the method according to the invention.

Portable communication device 1 is for instance a mobile phone, or a Personal Digital Assistant. For implementation of steps A0 to A1, device 1 comprises means for recording a voice message, and for generating, from said recorded voice message a multimedia file comprising at least said voice message. These means are classically the microphone already existing in a mobile phone. Generation of multimedia file is made by software processing under the control of the device's microprocessor.

For implementation of steps A2 to A3, device 1 comprises software means for generating a signal including said multimedia file and a specific flag for indication that voice message is to be displayed as a text message. This is also performed classically under the control of microprocessor.

At last, for implementation of step A4, classical transmission means of the device will be used for transmitting said signal to a separate terminal. These can be the radio transmitter associated to the mobile phone antenna, or a wired connection to a PC, or a connection to PC through a wireless connection of the blue tooth type, or an internet link through a server.

In case the language is determined, this can also be made through classical software means.

Separate terminal 2 may be a distant server or a PC. It must at least comprise the following features: means for receiving signal transmitted by said portable communication device 1, for extracting said voice message and detecting said specific flag; upon detection of said specific flag, software means for converting said voice message into a text message to be displayed.

Terminal 2 may also further comprises means for transmitting said text message to an end user terminal 3. End user terminal 3 may be another portable communication device, or the originating portable device 1. It may also consist in any other PC or server.

Thanks to the invention, a user is not limited anymore with the difficulty to enter a text massage, but can still transmit a message which can be displayed on a text format.

It will be apparent to those skilled in the art that various modifications and variations can be made in the method for transmitting a message from a portable communication device to a separate terminal, and associated portable device and terminal of the present invention without departing from the spirit or scope of the invention. Thus, it is intended that the present invention cover the modifications and variations of this invention provided they come within the scope of the appended claims and their equivalents.

The invention claimed is:

1. A method implemented in a portable communication device for generating a multimedia file including a voice message, the method comprising:

recording the voice message at the portable communication device;

generating at the portable communication device the multimedia file comprising at least the voice message and an indicator indicating that the voice message is to be displayed as a text message; and transmitting a signal from the portable communication device including the multimedia file and the indicator subsequent to the recording.

2. The method according to claim 1 wherein the multimedia file and the indicator are transmitted from the portable communication device in a same message.

3. The method of claim 2 wherein the message is a Short Message Service (SMS) or Multimedia Message Service (MMS) message.

4. The method according to claim 1 wherein the portable communication device does not transmit a text message corresponding to the voice message.

5. The method according to claim 1 further comprising:

identifying that the recorded voice message is to be converted to the text message, wherein the identifying includes receiving input information via a user interface indicating that the recorded voice message is to be displayed as the text message.

6. A portable communication device comprising:

a recording unit configured to receive and record a voice message;

a generating unit configured to generate, subsequent to the recording of the voice message, a multimedia file comprising at least the voice message and an indicator indicating that the voice message is to be displayed as a text message; and a transmitter configured to transmit a signal from the portable communication device, the signal including the multimedia file and the indicator.

7. The device according to claim 6 wherein the transmitter transmits the multimedia file and the indicator from the portable communication device in a same message.

8. The device of claim 7 wherein the message is a Short Message Service (SMS) or Multimedia Message Service (MMS) message.

9. The device according to claim 6 wherein the portable communication device does not transmit a text message corresponding to the voice message.

10. The device according to claim 6 further comprising:

a user interface through which a user may enter input information identifying that the recorded voice message is to be displayed as the text message.

11. The device according to claim 6 wherein the recording unit is further configured to identify that the recorded voice message is to be displayed as the text message responsive to the portable communication device entering a predetermined mode.

12. The device of claim 11 wherein the predetermined mode is any of Short Message Service (SMS) mode, Multimedia Message Service (MMS) mode, and blog mode.

13. The device according to claim 6 wherein the recording unit is further configured to determine a language used for the recorded voice message and wherein the signal further includes information relating to the determined language.

14. A portable communication terminal comprising:

a receiver configured to receive a signal, the signal including a multimedia file comprising at least a recorded voice message and an indicator indicating that the recorded voice message is to be displayed as a text message;

a control unit configured to extract the recorded voice message and the indicator and, responsive to extracting the indicator, convert the recorded voice message into a text message; and a display configured to display the text message.

15. The communication terminal according to claim 14 wherein the control unit extracts the indicator from a same received message including the recorded voice message.

16. The communication terminal according to claim 15 wherein the text message is a Short Message Service (SMS) or Multimedia Message Service (MMS) message.

17. The communication terminal according to claim 14 wherein the control unit extracts the indicator from within the multimedia file.

18. A first communication terminal comprising:

a receiver configured to receive a signal from a second communication terminal, the signal including a multimedia file comprising at least a recorded voice message and an indicator indicating that the recorded voice message is to be displayed as a text message;

a control unit configured to extract the recorded voice message and the indicator and, responsive to extracting the indicator, convert the recorded voice message into a text message; and a transmitter configured to transmit the text message to a third communication terminal.

19. The communication terminal according to claim 18 wherein the control unit extracts the indicator from a same message including the multimedia file.

20. The communication terminal according to claim 19 wherein the text message is a Short Message Service (SMS) or Multimedia Message Service (MMS) message.

21. The communication terminal according to claim 18 wherein the control unit extracts the indicator from within the multimedia file.

22. The communication terminal according to claim 18 wherein the signal further includes information relating to a language of the recorded voice message.

* * * * *